United States Patent
Watanabe

(10) Patent No.: US 10,802,808 B2
(45) Date of Patent: Oct. 13, 2020

(54) COMPILER AND PROGRAMMING SUPPORT DEVICE

(71) Applicant: Mitsubishi Electric Corporation, Tokyo (JP)

(72) Inventor: Nobutoshi Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 16/346,546

(22) PCT Filed: May 11, 2018

(86) PCT No.: PCT/JP2018/018352
§ 371 (c)(1),
(2) Date: May 1, 2019

(87) PCT Pub. No.: WO2019/215919
PCT Pub. Date: Nov. 14, 2019

(65) Prior Publication Data
US 2020/0264854 A1 Aug. 20, 2020

(51) Int. Cl.
*G06F 9/44* (2018.01)
*G06F 9/445* (2018.01)
(Continued)

(52) U.S. Cl.
CPC .............. *G06F 8/44* (2013.01); *G05B 19/05* (2013.01); *G05B 2219/13119* (2013.01)

(58) Field of Classification Search
CPC .. G06F 11/3624; G06F 11/3616; G06F 8/441; G06F 8/443; G06F 8/41;
(Continued)

(56) References Cited

U.S. PATENT DOCUMENTS

| 5,923,880 A | 7/1999 | Rose et al. |
| 7,100,156 B2 * | 8/2006 | Archambault ........ G06F 8/4435 712/241 |

(Continued)

FOREIGN PATENT DOCUMENTS

| JP | 9-101897 A | 4/1997 |
| JP | 2000-284815 A | 10/2000 |

(Continued)

OTHER PUBLICATIONS

McIntosh et al., Whole-program optimization of global variable layout, 9 pages (Year: 2006).*

(Continued)

*Primary Examiner* — Thuy Dao
(74) *Attorney, Agent, or Firm* — Xsensus LLP

(57) ABSTRACT

A non-transitory computer readable-medium storing a compiler to cause a computer to perform processing for compiling sequence programs including a declaration of a global variable and generating an execution program to be executed by a PLC. When there is a change in a memory address in the PLC assigned to the global variable between before and after edit of a declaration of the global variable, the compiler gives an execution code to synchronize a first value stored at a memory address assigned to an unedited global variable with a second value stored at a memory address assigned to an edited global variable to an execution program corresponding to the sequence program that references the edited global variable.

10 Claims, 14 Drawing Sheets

(51) Int. Cl.
*G06F 9/455* (2018.01)
*G06F 11/36* (2006.01)
*G06F 8/41* (2018.01)
*G05B 19/05* (2006.01)

(58) Field of Classification Search
CPC ... G06F 8/30; G06F 8/315; G06F 8/54; G06F 9/45516; G06F 9/4488; G06F 9/4494; G06F 3/0604; G06F 3/0619; G06F 3/0631
See application file for complete search history.

(56) References Cited

U.S. PATENT DOCUMENTS

| | | | |
|---|---|---|---|
| 8,381,174 B2* | 2/2013 | Rogers | G06F 9/52 717/105 |
| 10,353,679 B2* | 7/2019 | Mahaffey | G06F 8/443 |
| 2010/0161085 A1 | 6/2010 | Sumiya | |
| 2014/0207254 A1 | 7/2014 | Nishiyama et al. | |

FOREIGN PATENT DOCUMENTS

| | | |
|---|---|---|
| JP | 2001-290656 A | 10/2001 |
| JP | 2002-149421 A | 5/2002 |
| JP | 2013-025353 A | 2/2013 |
| JP | 2015-022511 A | 2/2015 |
| JP | 2015-215865 A | 12/2015 |
| WO | 2008/102426 A1 | 8/2008 |

OTHER PUBLICATIONS

International Search Report and Written Opinion dated Aug. 14, 2018 for PCT/JP2018/018352 filed on May 11, 2018, 2 pages (Japanese Copy Only).

Decision to Grant a Patent received for Japanese Patent Application No. 2018-552266, dated Nov. 13, 2018, 5 pages including English Translation.

* cited by examiner

FIG.3

```
                                    ┌361
GLOBAL VARIABLE
VAR_GLOBAL
    gVar1: INT;
    gVar2: REAL := 10.0;
END_VAR

VAR_GLOBAL RETAIN
    gVar3: INT;
    gVar4: WORD;
END_VAR
```

FIG.4

```
                                                              ┌35X
    ┌111P                              ┌111Q
  SEQUENCE PROGRAM              SEQUENCE PROGRAM
    gVar1 := P1;                     gVar1 := Q1;

P2 := gVar1;                     Q2 := gVar1;
```

FIG.5

MEMORY ALLOCATION INFORMATION 151

| VARIABLE NAME | DATA TYPE | CATEGORY | ATTRIBUTE | INITIAL VALUE | MEMORY ADDRESS | REFERENCE PROGRAM |
|---|---|---|---|---|---|---|
| gVar1 | INT | VAR_GLOBAL | | | Aa | P, Q |
| gVar2 | REAL | VAR_GLOBAL | | 10.0 | Ab | P, Q |
| gVar3 | INT | VAR_GLOBAL | RETAIN | | Ac | P, Q |
| gVar4 | WORD | VAR_GLOBAL | RETAIN | | Ad | P, Q |

FIG.9

MEMORY ALLOCATION INFORMATION 152

| VARIABLE NAME | DATA TYPE | CATEGORY | ATTRIBUTE | INITIAL VALUE | MEMORY ADDRESS | REFERENCE PROGRAM |
|---|---|---|---|---|---|---|
| gVar1 | INT | VAR_GLOBAL | RETAIN | | Aa(Ae) | Q |
| | | | | | Ae | P |
| gVar2 | REAL | VAR_GLOBAL | | 10.0 | Ab | P, Q |
| gVar3 | INT | VAR_GLOBAL | RETAIN | | Ac | P, Q |
| gVar4 | WORD | VAR_GLOBAL | RETAIN | | Ad | P, Q |

```
                                    ╭363
GLOBAL VARIABLE
VAR_GLOBAL
  (* gVar1: INT; *)
  gVar1: REAL;
  gVar2: REAL := 10.0;
END_VAR

VAR_GLOBAL RETAIN
  gVar3: INT;
  gVar4: WORD;
END_VAR
```

COMPILER AND PROGRAMMING SUPPORT DEVICE

CROSS-REFERENCE TO RELATED APPLICATION

The present application is based on PCT filing PCT/JP2018/018352 filed May 11, 2018, which is incorporated herein by reference.

FIELD

The present invention relates to a compiler that compiles a sequence program including a declaration of a global variable, and also relates to a programming support device.

BACKGROUND

A Programmable Logic Controller (PLC) that is a control device uses a sequence program to execute sequence control. This sequence program is created and compiled by a programming device, and thereafter written to the PLC.

There is a case where a sequence program includes a global variable that can be referenced from any sequence programs. This global variable is allocated to a memory area of the PLC by compilation. In order for sequence programs to access the global variable, a memory address assigned to the global variable is referenced.

In an information processor described in Patent Literature 1, in order to prevent a situation where only some of global variables have been updated, each of the global variables is allocated to two locations that are a public area and a work area. A higher-priority task uses the work area to update a global variable, while a lower-priority task uses the public area to reference the global variable. When the lower-priority task completes the reference of the global variable, this information processor interchanges the work area and the public area to thereby ensure simultaneity (also referred to as "consistency") of the time of referencing the global variable.

CITATION LIST

Patent Literature

Patent Literature 1: Japanese Patent Application Laid-open No. 2002-149421

SUMMARY

Technical Problem

However, in the conventional techniques including Patent Literature 1 described above, in a case where a global variable declaration is edited and thus there is a change in a memory address to be assigned to the global variable, compilation is performed in general on all the sequence programs referencing this global variable. This leads to a problem that a longer time is required for the compilation.

The present invention has been achieved in view of the above problems, and an object of the present invention is to provide a compiler that can reduce the time required for compilation.

Solution to Problem

To solve the above problem and achieve the object a compiler according to the present invention causes a computer to perform processing for compiling a sequence program including a declaration of a global variable and generating an execution program to be executed by a control device. When there is a change in a memory address in the control device assigned to the global variable between before and after edit of a declaration of the global variable, the compiler causes the computer to perform processing for giving an execution code to synchronize a first value stored at a memory address assigned to an unedited global variable with a second value stored at a memory address assigned to an edited global variable to an execution program corresponding to a sequence program that references the edited global variable.

Advantageous Effects of Invention

The compiler according to the present invention has an effect where it is possible to reduce the time required for compilation.

BRIEF DESCRIPTION OF DRAWINGS

FIG. 3 is an explanatory diagram of a global variable declaration according to the first embodiment.

FIG. 4 is a diagram illustrating an example of sequence programs that reference the global variables in FIG. 3.

FIG. 5 is a diagram illustrating a configuration of memory allocation information according to the first embodiment prior to updating the memory allocation information.

FIG. 9 is a diagram illustrating a configuration of memory allocation information according to the first embodiment after updating the memory allocation information.

DESCRIPTION OF EMBODIMENTS

A compiler and a programming support device according to embodiments of the present invention will be described in detail below with reference to the accompanying drawings. The present invention is not limited to the embodiments.

First Embodiment

Figure 1:
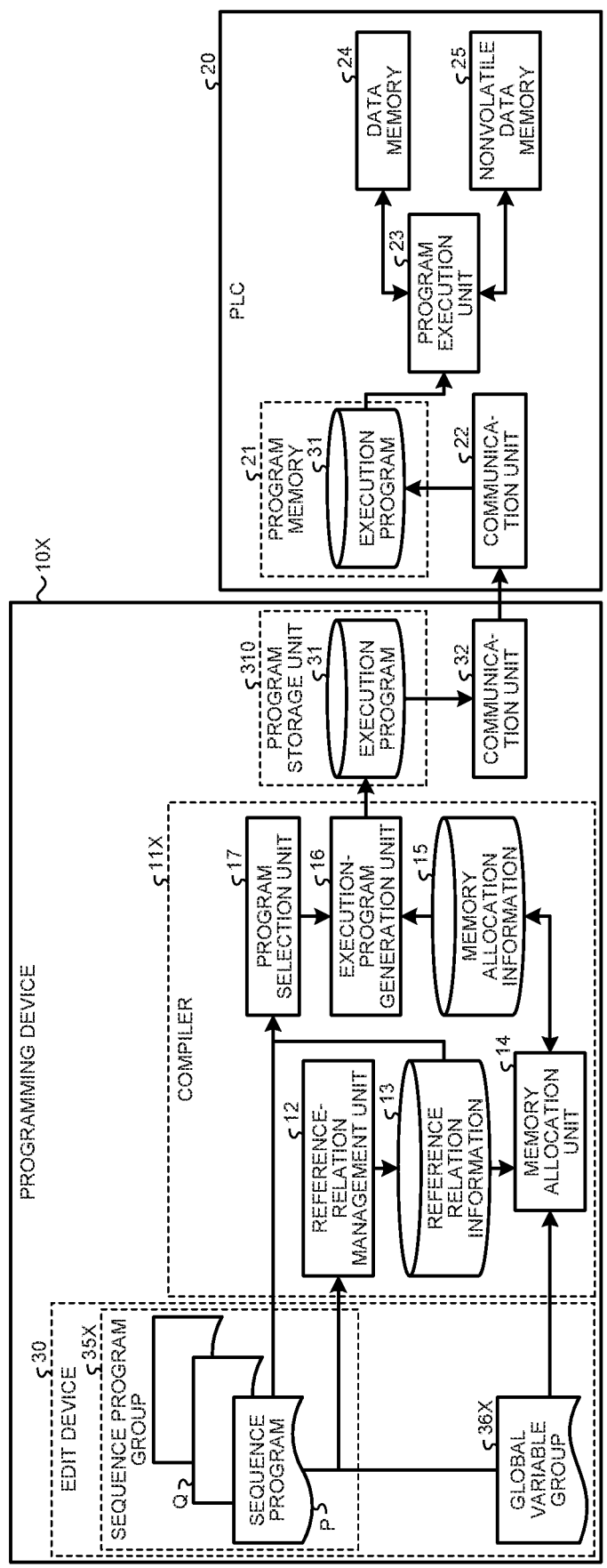
FIG. 1 is a block diagram illustrating a configuration of a programming device according to a first embodiment of the present invention.

FIG. 1 is a block diagram illustrating a configuration of a programming device according to a first embodiment of the present invention. A programming device 10X that is a programming support device is a computer that supports creation of a sequence program included in a sequence program group 35X. The programming device 10X uses a compiler 11X to compile a sequence program included in the sequence program group 35X.

The programming device 10X is connected to a PLC 20 that is a control device. The programming device 10X has: a function of creating the sequence program group 35X and a global variable group 36X; a function of editing a sequence program included in the sequence program group 35X; and a function of an editing declaration of a global variable included in the global variable group 36X. The programming device 10X also has a function of compiling the sequence program group 35X and the global variable group 36X, and thereby generating an execution program 31 that is executable for the PLC 20. Edit of a global variable in the present embodiment does not refer to processing for changing the value of the global variable, but refers to edit of the global variable declaration. Global variable declaration information includes data type, attribute, and the like which are described below.

The programming device 10X includes the compiler 11X, an edit device 30, a communication unit 32, and a program storage unit 310. The edit device 30 creates the sequence program group 35X and the global variable group 36X in accordance with instructions from a user, and edits the sequence program group 35X and global variable group 36X in accordance with instructions from a user. The edit device 30 stores therein the sequence program group 35X and the global variable group 36X which have been created or edited. It is allowable that the edit device 30 is configured separately from the programming device 10X. In this case, the edit device 30 is connected to the programming device 10X.

The sequence program group 35X includes a plurality of sequence programs such as a sequence program P and a sequence program Q. The global variable group 36X is a set of global variables to be used by the sequence program group 35X. The global variable group 36X includes a plurality of global variables such as gVar1 to gVar4 described below. Each global variable in the global variable group 36X is a variable with a global scope, and can be referenced by a plurality of sequence programs in the sequence program group 35X. Accordingly, it is possible for each global variable in the global variable group 36X to be referenced from a plurality of execution programs 31 written to the PLC 20.

For example, programming language specifications of the sequence program group 35X have been standardized by the International Electrotechnical Commission (IEC) as IEC 61131-3. It is possible for the sequence program group 35X to use a data-holding variable. The IEC 61131-3 standards define the programming language describing the sequence program group 35X, for example, an instruction list, a structured text, a ladder diagram, a function block diagram, and a sequential function chart. However, the programming language is not limited thereto in the present embodiment.

The compiler 11X is a program to generate the execution program 31 that is executable for the PLC 20. The compiler 11X compiles the sequence program group 35X and the global variable group 36X to thereby convert the sequence program group 35X and the global variable group 36X to the execution program 31. The compiler 11X can also compile only a part of the sequence programs included in the sequence program group 35X.

The compiler 11X includes a reference-relation management unit 12, a memory allocation unit 14, a program selection unit 17, and an execution-program generation unit 16. The reference-relation management unit 12 manages a reference relation between a sequence program and a global variable. The reference-relation management unit 12 creates reference relation information 13 that indicates a reference relation between a sequence program and a global variable. Specifically, the reference-relation management unit 12 registers reference relations between all the sequence programs included in the sequence program group 35X and all the global variables included in the global variable group 36X in the reference relation information 13.

The reference-relation management unit 12 updates the reference relation information 13 when the sequence program group 35X or the global variable group 36X is edited and accordingly there is a change in a reference relation between a sequence program included in the sequence program group 35X and a global variable included in the global variable group 36X.

Change or no-change information indicating which of the sequence programs and global variables has been changed or added is added to the reference relation information 13. Change-details information indicating details of the change in a sequence program and a global variable is added to the reference relation information 13. The change-details information is, for example, information including a global variable and the attribute associated with the global variable having been changed. The attribute is explained below. The reference-relation management unit 12 deletes the change or no-change information and the change-details information for a sequence program and a global variable whose compilation is completed from the reference relation information 13.

The memory allocation unit 14 allocates all the global variables included in the global variable group 36X to a data memory 24 or a nonvolatile data memory 25 in the PLC 20 on the basis of the reference relation information 13, and creates memory allocation information 15 that is a result of the allocation. The result of the allocation is a memory address in the data memory 24 or the nonvolatile data memory 25. The memory allocation unit 14 thus registers the memory address in the data memory 24 or the nonvolatile data memory 25 in the memory allocation information 15. In this manner, the memory allocation unit 14 sets a memory address for a global variable and registers the memory address in the memory allocation information 15.

The memory allocation unit 14 updates the memory allocation information 15 on the basis of the reference relation information 13 when the global variable group 36X is edited and thus there is a change in a memory address assigned to a global variable. For example, the memory allocation unit 14 sets a memory address allowable for the attribute of a global variable.

The program selection unit 17 selects a sequence program as a target to be compiled from among the sequence program group 35X on the basis of the change or no-change information added to the reference relation information 13. The edit device 30 may select a sequence program as a target to be compiled in accordance with instructions from a user.

When the sequence program group 35X is initially created, the program selection unit 17 selects all the sequence programs included in the sequence program group 35X as a target to be compiled.

The execution-program generation unit 16 uses the memory allocation information 15 and a sequence program selected from among the sequence program group 35X by the program selection unit 17 to generate the execution program 31 to be executed by the PLC 20. The execution program 31 is made up of execution codes that are a sequence of instructions interpretable and executable for the PLC 20. A sequence of instructions in the execution program 31 may be any form of sequence compatible with the architecture of the PLC 20.

The execution-program generation unit 16 stores the created execution program 31 in the program storage unit 310. The program storage unit 310 is a memory that stores therein the execution program 31. The communication unit 32 transmits the execution program 31 generated by the execution-program generation unit 16 to the PLC 20.

The PLC 20 executes sequence control by using the execution program 31 generated by the programming device 10X. The PLC 20 includes a program memory 21, a communication unit 22, a program execution unit 23, the data memory 24, and the nonvolatile data memory 25. Each of the data memory 24 and the nonvolatile data memory 25 is a memory that stores therein variables including a global variable to be referenced by the execution program 31. The data memory 24 is a volatile memory, while the nonvolatile data memory 25 is a nonvolatile memory.

The communication unit 22 receives the execution program 31 transmitted from the communication unit 32 in the programming device 10X, and stores the execution program 31 in the program memory 21. The program memory 21 is a memory that stores therein the execution program 31.

The program execution unit 23 reads out the execution program 31 from the program memory 21 and executes instructions forming the execution program 31. The data memory 24 is a memory to which, among the global variables used in the sequence program group 35X, having no power-interruption data retaining attribute, are allocated. The nonvolatile data memory 25 is a memory to which, among the global variables used in the sequence program group 35X having a power-interruption data retaining attribute, are allocated. The power-interruption data retaining attribute is an attribute for specifying that data is retained even when power interruption has occurred. Thus, a global variable, for which the power-interruption data retaining attribute has been set, is intended to retain data even when power interruption has occurred. The global variable with the power-interruption data retaining attribute is, for example, a global variable with the RETAIN attribute in the IEC 61131-3 standards. However, the power-interruption data retaining attribute is not limited to being represented as "RETAIN attribute".

The execution program 31 includes memory access instructions for referencing the data memory 24 and the nonvolatile data memory 25. The memory access instructions are supposed to be represented as follows.

write (X, Ax): Write the value of "X" to the area of a memory address Ax.

read (Ay, Y): Read the value in the area of a memory address Ay and write the read value to the area "Y".

In this manner, "X" indicates a value to be written to the area of the memory address Ax by the "write" instruction, while "Y" indicates an area where the value read from the area of the memory address Ay is written to by the "read" instruction. "X" and "Y" can be a value in any form compatible with the architecture of the PLC 20.

Reference to the data memory 24 is achieved by execution of the "write" instruction or the "read" instruction provided that the memory address Ax or the memory address Ay falls within the memory address range of the data memory 24. Reference to the nonvolatile data memory 25 is achieved by execution of the "write" instruction or the "read" instruction provided that the memory address Ax or the memory address Ay falls within the memory address range of the nonvolatile data memory 25. The memory address Ax and the memory address Ay can be in any form compatible with the architecture of the PLC 20.

Figure 2:
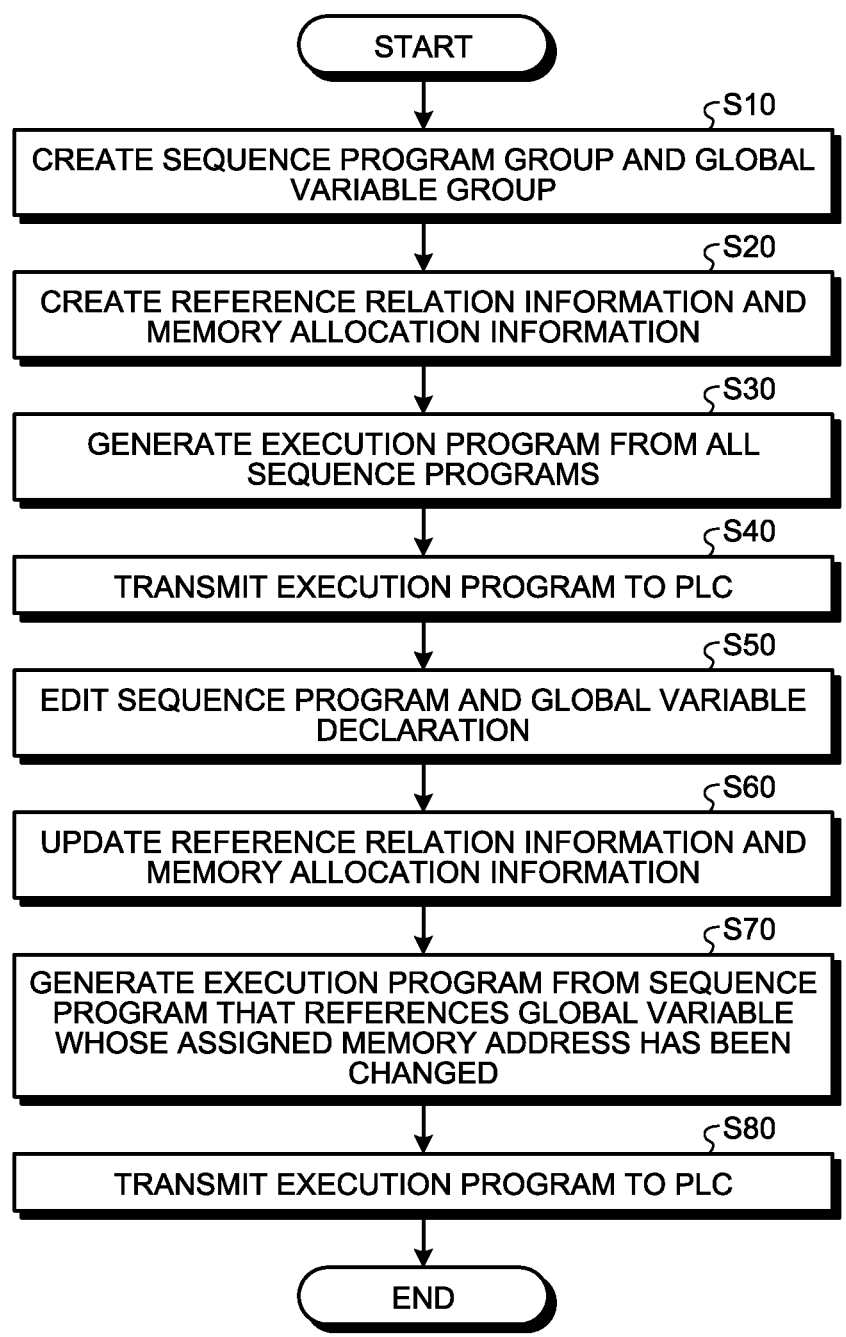
FIG. 2 is a flowchart illustrating an outline of an operational procedure for the programming device according to the first embodiment.

Next, an operational procedure for the programming device 10X will be described. FIG. 2 is a flowchart illustrating an outline of an operational procedure for the programming device according to the first embodiment. In the programming device 10X, the edit device 30 creates the sequence program group 35X and the global variable group 36X in accordance with instructions from a user (Step S10). In the compiler 11X, the reference-relation management unit 12 creates the reference relation information 13 indicating a reference relation between a sequence program in the sequence program group 35X and a global variable in the global variable group 36X. The memory allocation unit 14 assigns a memory address for a global variable in the global variable group 36X. Further, the memory allocation unit 14 creates the memory allocation information 15 on the basis of the memory address assigned to the global variable and the reference relation information 13 (Step S20).

The execution-program generation unit 16 generates the execution program 31 for all the sequence programs included in the sequence program group 35X (Step S30). Specifically, the execution-program generation unit 16 generates the execution program 31 by using the created sequence program group 35X and global variable group 36X. The communication unit 32 transmits the generated execution program 31 to the PLC 20 (Step S40). This makes it possible for the PLC 20 to execute the execution program 31.

Thereafter, in the programming device 10X, the edit device 30 edits a part of the global variable group 36X and a part of the sequence program group 35X in accordance with instructions from a user. That is, the edit device 30 edits a sequence program and a global variable declaration in accordance with instructions from a user (Step S50). Here, there is described a case where a part of the global variables in the global variable group 36X is edited and thus there is a change in an assigned memory address in the data memory 24 or the nonvolatile data memory 25. In the present embodiment, it is assumed that the global variables include gVar1, gVar2, gVar3, and gVar4, of which gVar1 is changed by editing the attribute and the like, while gVar2, gVar3, and gVar4 remain unchanged. In the present embodiment, it is further assumed that the sequence program group 35X includes the sequence programs P and Q, and the sequence program P is edited simultaneously with editing gVar1, and thus there is a change in a memory address to which gVar1 is written and from which gVar1 is read, while the sequence program Q remains unchanged.

After gVra1 and the sequence program P are edited, the reference-relation management unit 12 updates the reference relation information 13, while the memory allocation unit 14 updates the memory allocation information 15 (Step S60). Specifically, the reference-relation management unit 12 updates the change or no-change information and the change-details information in the reference relation information 13. On the basis of the reference relation information 13, the memory allocation unit 14 additionally assigns a memory address as a reference location for gVar1 of the sequence program P in the memory allocation information 15.

The program selection unit 17 selects the sequence program P as a target to be compiled from among the sequence program group 35X on the basis of the reference relation information 13. The sequence program P selected by the program selection unit 17 references a global variable whose assigned memory address has been changed. Accordingly, the execution-program generation unit 16 generates an execution program for the sequence program that references a global variable whose assigned memory address has been changed (Step S70). An execution program generated using the sequence program P is hereinafter referred to as "execution program EP". In this manner, the execution-program generation unit 16 according to the present embodiment compiles only the sequence program P in the sequence program group 35X including the plural sequence programs P and Q, the sequence program P referencing a global variable whose assigned memory address has been changed. The communication unit 32 transmits the generated execution program EP to the PLC 20 (Step S80). Due to this operation, the PLC 20 replaces the previous execution program 31 which is a counterpart of the execution program EP with the received execution program EP.

Next, specific processing performed by the programming device 10X is described. FIG. 3 is an explanatory diagram of a global variable declaration according to the first embodiment. FIG. 3 illustrates an example of a global variable declaration in accordance with the method for a global variable declaration defined in the IEC 61131-3 standards. A global variable declaration 361 is equivalent to the global variable group 36X in the programming device 10X. FIG. 3 illustrates a case where gVar1 is declared as a global variable of INT type, gVar2 is declared as a global variable of REAL type with the initial value of 10.0, gVar3 is declared as a global variable of INT type with the power-interruption data retaining attribute, and gVar4 is declared as a global variable of WORD type with the power-interruption data retaining attribute. The data type, such as the INT type, the REAL type, and the WORD type, represents a data size or the like of the global variable, for example. In the present embodiment, there is described a case where an unedited global variable and an edited global variable are of the same data type, and the settable data size is the same between the unedited and edited global variables. The method for a global variable declaration according to the present embodiment is not limited to the format illustrated in FIG. 3.

FIG. 4 is a diagram illustrating an example of sequence programs that reference the global variables in FIG. 3. FIG. 4 illustrates an example of sequence programs described in the structured text defined by the IEC 61131-3 standards. The sequence program group 35X illustrated in FIG. 4 includes sequence programs 111P and 111Q. The sequence program 111P is an example of the sequence program P before being changed. The sequence program 111Q illustrated in FIG. 4 is an example of the sequence program Q before being changed.

In the sequence program 111P, "P1" is written to the global variable gVar1, and thereafter the value of the global variable gVar1 is read at "P2". Similarly, in the sequence program 111Q, "Q1" is written to the global variable gVar1, and thereafter the value of the global variable gVar1 is read at "Q2". In FIG. 4, reference to the global variables other than gVar1 is omitted. Reference to the global variable is not limited to the format illustrated in FIG. 4.

A global variable declared in the global variable declaration 361 is allocated to a memory address in the data memory 24 or the nonvolatile data memory 25 by the memory allocation unit 14. The execution program 31 is generated by compilation. At the time of executing the execution program 31, the memory address assigned to the global variable is referenced. In this example, the memory allocation unit 14 allocates gVar1 and gVar2 to the data memory 24, while allocating gVar3 and gVar4 to the nonvolatile data memory 25 on the basis of the global variable declaration 361.

FIG. 5 is a diagram illustrating a configuration of memory allocation information according to the first embodiment prior to updating the memory allocation information. FIG. 5 illustrates a configuration example of memory allocation information 151 created by the memory allocation unit 14 on the basis of the global variable declaration 361. The memory allocation information 151 is an example of the memory allocation information 15. The memory allocation information 151 holds therein a memory address of a global variable allocated to the data memory 24 or the nonvolatile data memory 25.

The memory allocation information 151 is information indicating a correspondence relation among a global variable in the global variable group 36X, a memory address assigned to the global variable, and a sequence program that references this memory address.

The memory allocation information 151 has gVar1, gVar2, gVar3, and gVar4 registered therein as the name of global variable. In the memory allocation information 151, data type, category, attribute, initial value, memory address, and reference program are associated with each global variable.

The data type indicates a data type of a global variable such as the INT type, the REAL type, and the WORD type. The category indicates a scope or a usage method of the variable. The attribute indicates a characteristic of the variable such as power-interruption data retaining or a constant. In the memory allocation information 151, VAR_GLOBAL indicating a global variable is registered for each global variable, and RETAIN is registered for a global variable with the power-interruption data retaining attribute. The initial value is an initial value of a global variable.

The memory address indicates a memory address assigned to a global variable. The reference program indicates a sequence program that references the memory address. The memory allocation information 151 illustrates a case in which "Aa", "Ab", "Ac", and "Ad" indicating memory addresses Aa, Ab, Ac, and Ad, respectively, are registered in the memory-address section. In the reference-program section, "P" indicates the sequence program P, while "Q" indicates the sequence program Q. The reference programs in this example are the sequence program 111P and the sequence program 111Q.

The memory allocation information 151 indicates that gVar1 is allocated to the memory address Aa in the data memory 24, gVar2 is allocated to the memory address Ab in the data memory 24, gVar3 is allocated to the memory address Ac in the nonvolatile data memory 25, and gVar4 is allocated to the memory address Ad in the nonvolatile data memory 25. The format of the memory allocation information 15 is not limited to the format illustrated in FIG. 5.

It is assumed that the reference relation information 13 indicates that gVar1, gVar2, gVar3, and gVar4 are referenced respectively from the sequence programs 111P and 111Q. In this case, the memory allocation information 151 created using the reference relation information 13 also indicates that gVar1, gVar2, gVar3, and gVar4 are referenced by the sequence programs 111P and 111Q.

Figures 6, 7:
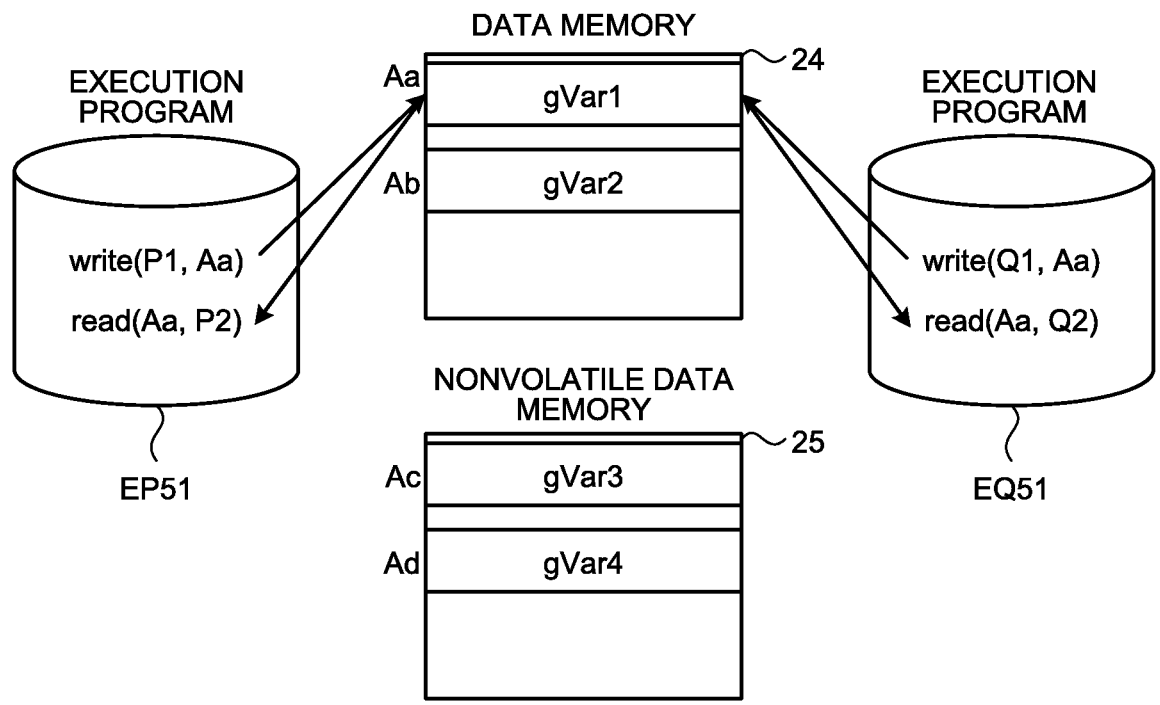
FIG. 6 is a diagram illustrating a relation between an execution program and a memory address as a reference location according to the first embodiment prior to editing a global variable.
FIG. 7 is an explanatory diagram of an example of a global variable declaration according to the first embodiment after the global variable illustrated in FIG. 3 has been edited.

Here, a relation between execution programs generated from the sequence programs 111P and 111Q and memory addresses referenced respectively by these execution programs is described. FIG. 6 is a diagram illustrating a relation between an execution program and a memory address as a reference location according to the first embodiment prior to editing a global variable. FIG. 6 illustrates a concept of allocation of unedited global variables to the data memory 24 or the nonvolatile data memory 25.

FIG. 6 illustrates a relation between an execution program EP51 generated by compiling the sequence program 111P, an execution program EQ51 generated by compiling the sequence program 111Q, the data memory 24, and the nonvolatile data memory 25.

"write" in the execution program EP51 is an instruction to perform writing of "P1" to the memory address Aa to which gVar1 is assigned. "read" in the execution program EP51 is an instruction to perform reading of the value at the memory address Aa to which gVar1 is assigned and writing the read value to "P2". These instructions mean writing "P1" to gVar1 and writing the value read from gVar1 to "P2", respectively, in the sequence program 111P that is a source program of the execution program EP51.

Similarly, "write" in the execution program EQ51 is an instruction to perform writing of "Q1" to the memory address Aa to which gVar1 is assigned. "read" in the execution program EQ51 is an instruction to perform reading of the value at the memory address Aa to which gVar1 is assigned and writing the read value to "Q2". These instructions mean writing "Q1" to gVar1 and writing the value read from gVar1 to "Q2", respectively, in the sequence program 111Q that is a source program of the execution program EQ51. In FIG. 6, reference of the global variables other than gVar1 is omitted.

FIG. 7 is an explanatory diagram of an example of a global variable declaration according to the first embodiment after the global variable illustrated in FIG. 3 has been edited. FIG. 7 illustrates a global variable declaration 362 in a case where gVar1 has been changed in such a manner as to have the power-interruption data retaining attribute as compared to the global variable declaration 361 illustrated in FIG. 3. In the global variable declaration 362, gVar1 having been declared in FIG. 3 is treated as a comment and thus deleted, and instead gVar1 is declared as a global variable with the power-interruption data retaining attribute.

Figure 8:
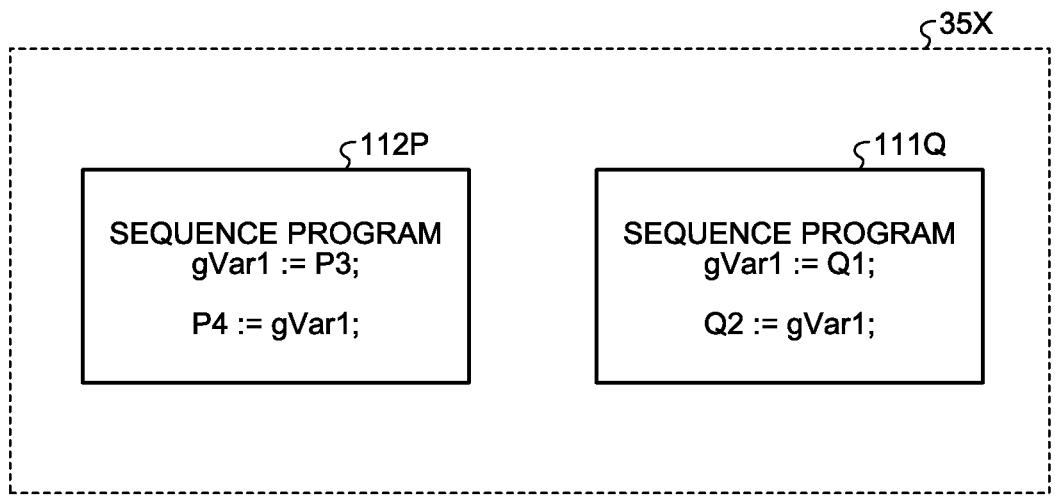
FIG. 8 is an explanatory diagram of an example of a sequence program after the sequence program illustrated in FIG. 4 has been edited.

FIG. 8 is an explanatory diagram of an example of a sequence program after the sequence program illustrated in FIG. 4 has been edited. The sequence program group 35X illustrated in FIG. 8 includes a sequence program 112P and the sequence program 111Q. The sequence program 112P illustrated in FIG. 8 is an example of the sequence program P having been changed.

Simultaneously with editing gVar1 as described above, the sequence program 111P illustrated in FIG. 4 is assumed to have been changed to the sequence program 112P illustrated in FIG. 8. That is, it is assumed that the value to be written to gVar1 has been changed from "P1" to "P3", and the area to which the read value of gVar1 is written has been changed from "P2" to "P4". The sequence program 111Q illustrated in FIG. 8 remains unchanged.

FIG. 9 is a diagram illustrating a configuration of memory allocation information according to the first embodiment after updating the memory allocation information. FIG. 9 illustrates a configuration example of memory allocation information 152 created on the basis of the global variable declaration 362 by the memory allocation unit 14. The memory allocation information 152 is an example of the memory allocation information 15. The memory allocation information 152 is created by the memory allocation unit 14 updating the memory allocation information 151 when the global variable declaration 361 is changed to the global variable declaration 362 and simultaneously the sequence program 111P is changed to the sequence program 112P. Accordingly, the reference programs in the memory allocation information 152 are the sequence program 112P and the sequence program 111Q. Similarly to the memory allocation information 151, the memory allocation information 152 holds therein a memory address of a global variable allocated to the data memory 24 or the nonvolatile data memory 25.

In the global variable declaration 362 and the sequence program 112P, since gVar1 has been edited, the items associated with gVar1 in the memory allocation information 152 have been updated as compared to the memory allocation information 151. Here, there is described a case where the memory allocation unit 14 assigns a memory address Ae for gVar1 anew.

In the item, assigned memory address, which is one of the items associated with gVar1, a memory address before editing gVar1 and a memory address after editing gVar1 are both registered. Specifically, in the memory-address section associated with gVar1, the memory address Aa that is a memory address before editing gVar1, and the memory address Ae that is a memory address after editing gVar1 are respectively registered. In the reference-program section associated with gVar1, the sequence program Q that is a first program associated with the memory address Aa before editing gVar1, and the sequence program P that is a second program associated with the memory address Ae after editing gVar1 are respectively registered.

In the memory allocation information 152, the information is registered for gVar1 which indicates that the memory address Aa to be referenced by the sequence program Q has been changed to the memory address Ae. This information shows that the value at the memory address Aa needs to be synchronized with the value at the memory address Ae.

Figure 10:
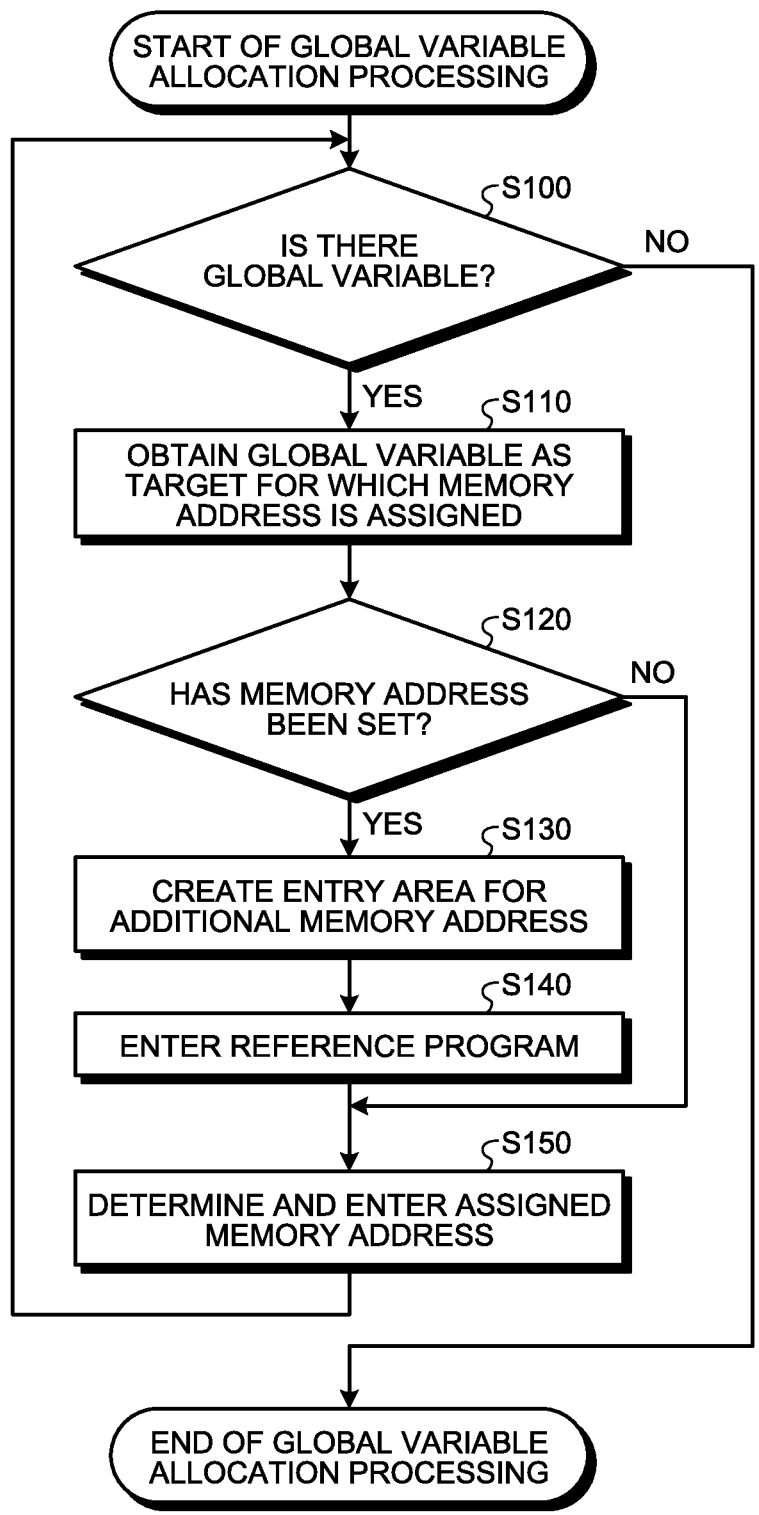
FIG. 10 is a flowchart illustrating a processing procedure for global variable allocation performed by the programming device according to the first embodiment.

Next, a processing procedure for global variable allocation performed by the programming device 10X will be described. FIG. 10 is a flowchart illustrating the processing procedure for global variable allocation performed by the programming device according to the first embodiment.

An operational procedure for the memory allocation unit 14 is described here. The memory allocation unit 14 determines whether there is a global variable in the global variable group 36X after having been edited (Step S100). In other words, the memory allocation unit 14 determines whether a global variable has been declared.

When there is a global variable (YES at Step S100), the memory allocation unit 14 obtains a target global variable for which a memory address is assigned (Step S110). This processing is to obtain the target global variable from the global variable group 36X, that is, to obtain a global variable edited before compilation. Specifically, the memory allocation unit 14 obtains a global variable, for which an additional memory address needs to be assigned due to the edit of the global variable, from among the global variable group 36X.

Subsequently, the memory allocation unit 14 determines whether an assigned memory address has been set to the obtained global variable (Step S120). When the memory address has been set to the global variable (YES at Step S120), this global variable is an existing global variable. A global variable resulting from editing the existing global variable becomes a target for which a memory address is assigned. The memory allocation unit 14 thus assigns an additional memory address for the target global variable while maintaining the existing assigned memory address. Accordingly, the memory allocation unit 14 creates an entry area for registering the additional memory address in the memory allocation information 152 (Step S130). The entry area in the memory allocation information 15 may be any area as long as the area is compatible with the memory allocation information 15.

The memory allocation unit 14 registers a reference program in the additionally created entry area (Step S140). At Step S140, the memory allocation unit 14 references the reference relation information 13 to determine a reference program, and registers the determined reference program in the memory allocation information 152.

Further, the memory allocation unit 14 determines a memory address assigned to a global variable of a target to be compiled, and registers the memory address in the created entry area (Step S150).

On the other hand, when the memory address has not yet been set at Step S120 (NO at Step S120), the global variable obtained by the memory allocation unit 14 is a target global variable to which a memory address is assigned for the first time. In this case, the memory allocation unit 14 determines a memory address assigned to the target global variable and registers the memory address in the memory allocation information 152 (Step S150). Any method is applicable to determine an assigned memory address as long as the method is compatible with the architecture of the PLC 20.

Thereafter, the memory allocation unit 14 determines whether there is still a remaining global variable in the global variable group 36X, that is, whether there is a global variable that needs to undergo allocation processing (Step S100).

When there is a global variable (YES at Step S100), the memory allocation unit 14 repeats the processing of Steps S110 to Step S150 and Step S100 described above. On the other hand, when there is not a global variable (NO at Step S100), the memory allocation unit 14 ends the allocation processing. That is, when assignment of a memory address for each of global variables is completed, the memory allocation unit 14 ends the allocation processing. By performing the global variable allocation processing described above, the memory allocation unit 14 can set an assigned memory address for each of global variables. It is also possible for the memory allocation unit 14 to set a plurality of assigned memory address for an edited global variable.

In the present embodiment, according to the processing described with reference to FIG. 10, the memory address Ae and the sequence program P that is a reference program are both registered for gVar1 in the memory allocation information 152. Thereafter, the execution-program generation unit 16 creates the execution program EP by using the memory allocation information 152 for the sequence program 112P edited from the sequence program 111P.

Figure 11:
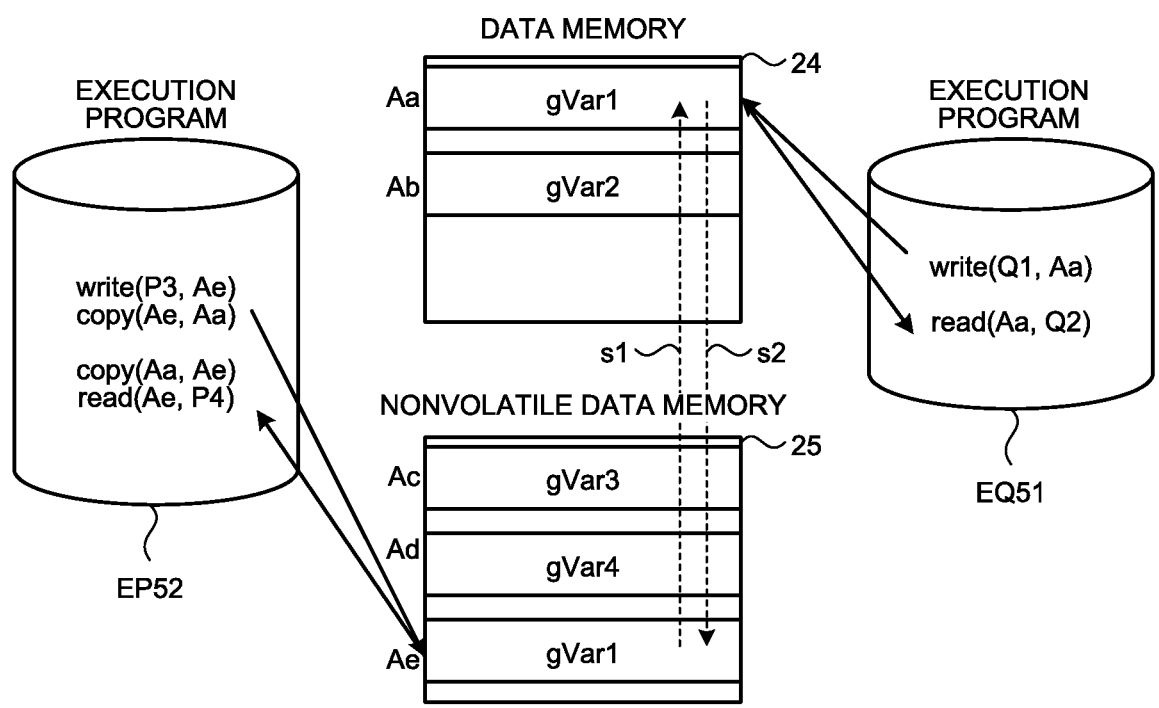
FIG. 11 is a diagram illustrating a relation between an execution program and a memory address as a reference location according to the first embodiment after a global variable has been edited.

Here, a relation between execution programs generated after the sequence program group 35X and the global variable group 36X have been edited and memory addresses referenced respectively by these execution programs is described. FIG. 11 is a diagram illustrating a relation between an execution program and a memory address as a reference location according to the first embodiment after a global variable has been edited. FIG. 11 illustrates a concept of allocation of global variables after the edit to the data memory 24 or the nonvolatile data memory 25. FIG. 11 illustrates a relation among an execution program EP52 generated by compiling the sequence program 112P, the execution program EQ51 having already been created, the data memory 24, and the nonvolatile data memory 25. In FIG. 11, reference of the global variables other than gVar1 is omitted.

In the present embodiment, the sequence program 112P is created by editing the sequence program 111P, while the sequence program 111Q is not edited. Accordingly, it is the sequence program 112P that is compiled, while the sequence program 111Q does not need to be compiled.

In FIG. 11, "write" in the execution program EP52 is an instruction to perform writing of "P3" to the memory address Ae to which gVar1 is assigned. "read" in the execution program EP52 is an instruction to perform reading of the value at the memory address Ae to which gVar1 is assigned and writing the read value to "P4". These instructions mean writing "P3" to gVar1 and writing the value read from gVar1 to "P4", respectively, in the sequence program 112P that is a source program of the execution program EP52. Since the execution program EQ51 is not edited, the execution program EQ51 is thus identical to the execution program EQ51 described in FIG. 6.

As illustrated in FIG. 11, gVar1 referenced by the execution program EP52 that is updated by edition is allocated to the memory address Ae in the nonvolatile data memory 25. gVar1 referenced by the execution program EP52 that is updated by edition is allocated to the memory address Ae in the nonvolatile data memory 25. gVar1 referenced by the unedited execution program EQ 51 remains to be allocated to the memory address Aa in the data memory 24. In this manner, while an address assigned to an unedited global variable is maintained, allocation of an edited global variable is performed.

The sequence program 112P that is a target to be compiled references gVar1, which is achieved by referencing to the memory address Ae additionally assigned to gVar1 in the nonvolatile data memory 25. That is, in the execution program EP52, an execution code for writing to gVar1 is given as "write" to the memory address Ae, and an execution code for reading from gVar1 is given as "read" at the memory address Ae.

The execution-program generation unit 16 according to the present embodiment inserts an instruction to synchronize the value stored at the memory address Aa remaining unchanged with the value stored at the changed memory address Ae between the instructions to reference an additionally allocated global variable. Specifically, the execution-program generation unit 16 inserts a "copy (Bc, Bd)" instruction (copy instruction) immediately after "write" and immediately before "read".

copy (Bc, Bd): The value at a memory address Bc is written to the area of a memory address Bd.

FIG. 11 illustrates a case where one of Bc and Bd is Ae and the other is Aa. "copy" inserted between "write" and "read" in this example is an instruction that operates in an inseparable manner with the immediately precedent "write" or the immediately subsequent "read". In the execution program EP52 in FIG. 11, a "copy (Ae, Aa)" instruction is inserted immediately after "write (P3, Ae)". When this "copy (Ae, Aa)" instruction is executed, the value of gVar1 allocated to the memory address Ae in the nonvolatile data memory 25 is copied and written to gVar1 allocated to the memory address Aa in the data memory 24 (s1).

Similarly, in the execution program EP52 in FIG. 11, a "copy (Aa, Ae)" instruction is inserted immediately before "read (Ae, P4)". When this "copy (Aa, Ae)" instruction is executed, the value of gVar1 allocated to the memory address Aa in the data memory 24 is copied and written to gVar1 allocated to the memory address Ae in the nonvolatile data memory 25 (s2).

Thus, the value of gVar1 to be referenced by the sequence program 112P becomes equal to the value of gVar1 to be reference by the sequence program 111Q. As a result, even in a case where gVar1 is edited, it is still possible for the edited execution program EP52 and the unedited execution program EQ51 to reference an equal value of gVar1.

Figure 12:
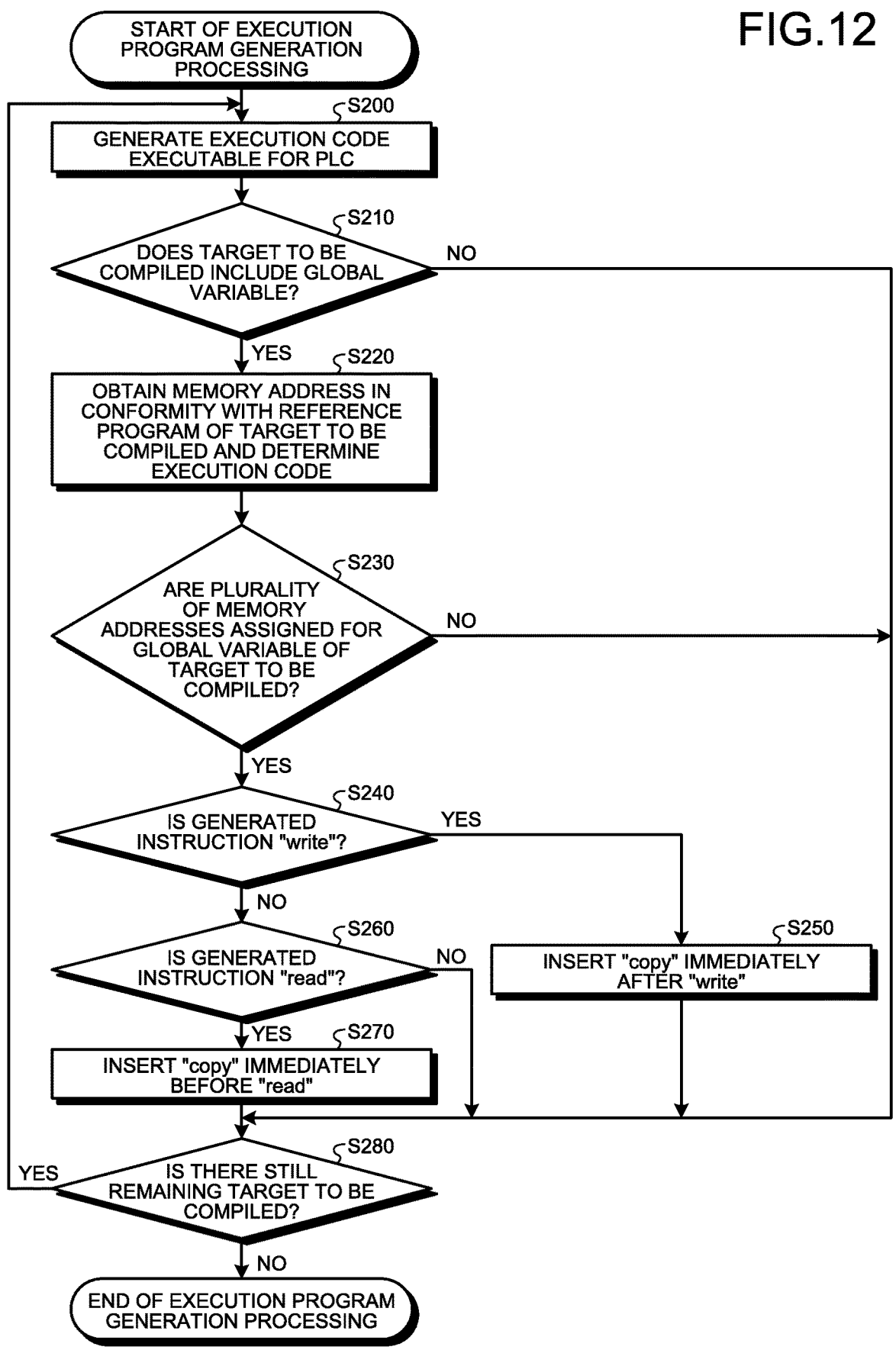
FIG. 12 is a flowchart illustrating a processing procedure for generating an execution program by the programming device according to the first embodiment.

A processing procedure for generating the execution program EP52 will be described. FIG. 12 is a flowchart illustrating a processing procedure for generating an execution program by the programming device according to the first embodiment.

The processing for generating the execution program EP52 from the sequence program 112P by the execution-program generation unit 16 will be described below. The execution-program generation unit 16 performs the processing of S200 to S280 on the sequence program 112P as a target to be compiled on a specific unit-by-unit basis. The specific unit of the sequence program 112P may be any unit compatible with the programming language describing the sequence program 112P. The specific unit is, for example, one row of the sequence program 112P.

The execution-program generation unit 16 generates an execution code that is executable for the PLC 20 on a specific unit-by-unit basis for the sequence program 112P (Step S200). In a case where a global variable appears during generation of this execution code, the execution-program generation unit 16 sets a memory address assigned to the global variable at an arbitrary value.

Next, the execution-program generation unit 16 determines whether a specific unit of the target to be compiled includes a global variable (Step S210). Specifically, the execution-program generation unit 16 determines whether the specific unit used at Step S200 includes a global variable.

When the target to be compiled includes a global variable (YES at Step S210), the execution-program generation unit 16 obtains a memory address in conformity with a reference program of the target to be compiled, and determines an execution code (Step S220). On the basis of the memory allocation information 152, the execution-program generation unit 16 obtains the memory address Ae, which is associated with the sequence program P that is a target to be compiled, from the memory addresses Aa and Ae assigned to gVar1 that is a target to be compiled. In other words, the execution-program generation unit 16 obtains any of the memory addresses assigned to a global variable as a target to be compiled, the obtained memory address being associated with a reference program as a target to be compiled. The execution-program generation unit 16 replaces the memory address assigned to the global variable, which has been set at an arbitrary value at Step S200, with the obtained memory address, and simultaneously determines an execution code corresponding to this obtained memory address. Thus, even in a case where a global variable is allocated to a plurality of memory addresses, a memory address to be referenced by a sequence program as a target to be compiled can still be set.

Subsequently, the execution-program generation unit 16 determines whether a plurality of memory addresses are assigned to a global variable of the target to be compiled (Step S230). When a plurality of memory addresses such as the memory addresses Aa and Ae are assigned to a global variable of the target to be compiled (YES at Step S230), the execution-program generation unit 16 creates a "copy" instruction in the execution program EP52 in order to store an equal value at the memory addresses Aa and Ae.

The execution-program generation unit 16 determines whether it is a "write" instruction that has already been generated in the execution program EP52 (Step S240). When it is a "write" instruction that has already been generated in the execution program EP52 (YES at Step S240), the execution-program generation unit 16 inserts "copy" immediately after the "write" instruction (Step S250). The execution-program generation unit 16 regards the memory address Ae obtained at Step S220 as a memory address from which the value is obtained by "copy", and sets a memory address to which the value is written by "copy" on the basis of the memory allocation information 152. At this time, the execution-program generation unit 16 sets the memory address Aa as a location where the value is written to by "copy" other than the memory address Ae obtained at Step S220 among from the memory address Aa or the memory address Ae which have been determined at Step S230 as memory addresses to which a plurality of memory addresses are assigned. In the case where there are a plurality of memory addresses as described above, the execution-program generation unit 16 inserts "copy" in the execution program EP52 in accordance with the number of memory addresses.

When it is not a "write" instruction that has already been generated in the execution program EP52 (NO at Step S240), the execution-program generation unit 16 determines whether it is a "read" instruction that has already been generated in the execution program EP52 (Step S260). When it is a "read" instruction that has already been generated in the execution program EP52 (YES at Step S260), the execution-program generation unit 16 inserts "copy" immediately before "read" (Step S270).

In the same manner as at Step S250, the execution-program generation unit 16 sets the memory address Aa from which the value is obtained by "copy" and the memory address Ae to which the value is written by "copy". The execution-program generation unit 16 performs the processing of Step S280 after the processing of Step S250 or Step S270.

When it is not a "read" instruction that has already been generated in the execution program EP52 at Step S260 (NO at Step S260), a "copy" instruction is not needed. In this case, the execution-program generation unit 16 performs the processing of Step S280 without inserting a "copy" instruction.

When a plurality of memory addresses are not assigned to a global variable of the target to be compiled at Step S230 (NO at Step S230), the global variable of the target to be compiled is allocated to only a single memory address. Thus, a "copy" instruction is not needed. In this case, the execution-program generation unit 16 performs the processing of Step S280 without inserting a "copy" instruction.

When a target to be compiled does not include a global variable at Step S210 (NO at Step S210), the execution-program generation unit 16 performs the processing of Step S280 without inserting a "copy" instruction.

After Step S250, after Step S270, when the determination is NO at Step S260, when the determination is NO at Step S230, or when the determination is NO at Step S210, the execution-program generation unit 16 determines whether there is still a remaining target to be compiled (Step S280). Since the execution-program generation unit 16 repeats the processing of Steps S200 to S280 on the sequence program 112P on a specific unit-by-unit basis, the execution-program generation unit 16 determines whether a specific unit that is a target to be compiled still remains in the sequence program 112P. That is, the execution-program generation unit 16 determines whether a specific unit not yet having undergone the processing of Steps S200 to S280 is still present in the target to be compiled.

When there is still a remaining target to be compiled (YES at Step S280), the execution-program generation unit 16 repeats the processing of Steps S200 to S280 on a specific unit in the remaining target to be compiled. When there is not a remaining target to be compiled (NO at Step S280), the execution-program generation unit 16 ends the processing for generating the execution program EP52.

In the manner as described above, the execution-program generation unit 16 synchronizes values held at a plurality of memory addresses with each other between the memory addresses by using "copy" so that values of the global variable, a plurality of sequence programs 112P and 111Q reference, can be only a single value.

In a case where values held at a plurality of memory addresses are not synchronized with each other among the memory addresses by using "copy", when the global variable is updated and accordingly there is a change in a memory address assigned to the global variable, then it becomes necessary to compile all the sequence programs referencing this global variable.

Particularly, in a large-sized system having a larger number of sequence programs installed, when a specific global variable is edited, then the sequence programs referencing this global variable are all targeted for compilation and writing to a PLC. Therefore, the large-sized system requires a longer time for compiling and writing the sequence programs to the PLC.

A system using sequence programs repeats compilation and writing of the sequence programs to a PLC frequently due to operational adjustment at the time of starting up a device that is controlled by the PLC or debugging. Accordingly, a longer time is also required for compiling and writing the sequence programs to the PLC at the time of the adjustment or debugging.

On the other hand, the programming device 10X according to the present embodiment can limit a target to be compiled to the sequence program 112P with a global variable whose assigned memory address has been changed. In the present embodiment, the case has been described in which "copy" is inserted immediately after "write" to thereby synchronize the values of a global variable with each other using the plural instructions. It is also allowable to insert a single instruction to execute both "copy" and "write" instead of the individual "copy" and "write" instructions. Similarly, in the present embodiment, the case has been described in which "copy" is inserted immediately before "read" to thereby synchronize the values of a global variable with each other using the plural instructions. It is also allowable to insert a single instruction to execute both "read" and "copy" instead of the individual "read" and "copy" instructions. As described above, it is allowable that the programming device 10X forms an execution code from a single instruction or from a plurality of instructions.

As described above, according to the first embodiment, in the case where there is a change in a memory address to be assigned to a global variable between before and after edit of the global variable declaration, the value held at the memory address Aa assigned to the unedited global variable is synchronized with the value held at the memory address Ae assigned to the edited global variable by using a "copy" instruction. Due to this operation, an unedited sequence program 111Q, which references the unedited global variable allocated to the memory address Aa, can be excluded from the target to be compiled. Accordingly, the processing time required to compile sequence programs can be reduced.

The PLC 20 can execute sequence control using the execution program EQ51, as it is, corresponding to the unedited sequence program 111Q. Accordingly, at the time of writing the execution program EP52 to the PLC 20, writing of the execution program EQ51 to the PLC 20 can be omitted.

Second Embodiment

Next, a second embodiment of the present invention will be described with reference to FIGS. 13 to 15. In the second embodiment, a sequence program is compiled using a compilation method set by a user. In a case where a specific compilation method is selected, a global variable is allocated to a plurality of memory addresses in the manner as described in the first embodiment by using an instruction to perform data type conversion even when the settable data size differs between an unedited global variable and an edited global variable.

Figure 13:
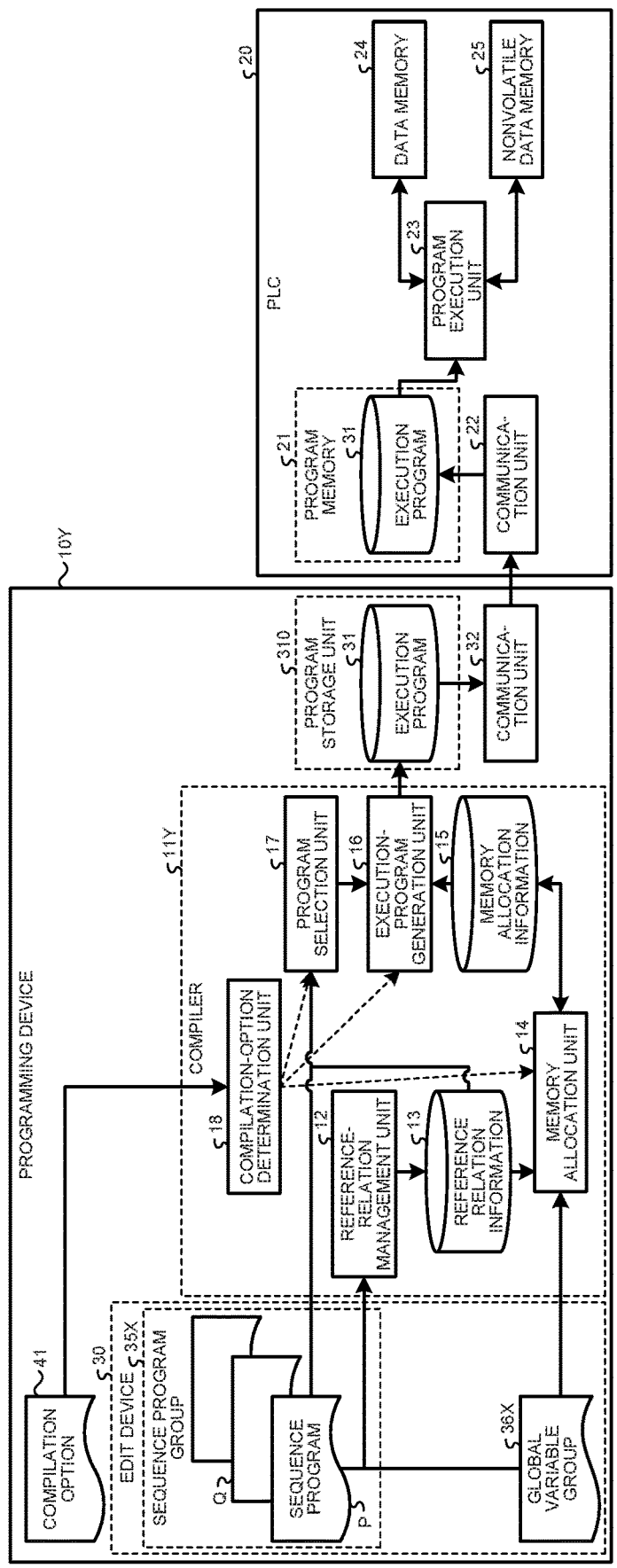
FIG. 13 is a block diagram illustrating a configuration of a programming device according to a second embodiment.

FIG. 13 is a block diagram illustrating a configuration of a programming device according to the second embodiment. Among the respective constituent elements in FIG. 13, constituent elements realizing the same functions as those of the programming device 10X according to the first embodiment illustrated in FIG. 1 are denoted by like reference signs and redundant descriptions thereof are omitted.

A programming device 10Y that is a programming support device is different from the programming device 10X such that the programming device 10Y includes a compilation-option determination unit 18 that selects a compilation method on the basis of a compilation option 41. Specifically, the programming device 10Y includes a compiler 11Y, the edit device 30, the communication unit 32, and the program storage unit 310. The compiler 11Y includes the compilation-option determination unit 18 in addition to the constituent elements of the compiler 11X.

The compilation option 41 is information to designate a compilation selecting method. In the compilation option 41, a first option or a second option has been set. The first option is shown as a value indicating a compilation method to assign only a single memory address for each global variable. The second option is shown as a value indicating a compilation method to assign a plurality of memory addresses for each global variable. A user thus stores a value indicating the first option or a value indicating the second option in the compilation option 41 in advance.

In compilation with the first option, since only a single memory address is assigned to each global variable, the sequence programs, referencing the global variable whose assigned memory address has been changed, all become a target to be compiled.

In compilation with the second option, it is possible to allocate a global variable to a plurality of memory addresses in the same manner as in the first embodiment so as to limit the sequence programs as targets to be compiled. It is assumed in some cases that the value of a global variable allocated to a plurality of memory addresses may not match between the sequence programs referencing this global variable.

On the basis of the compilation option 41, the compilation-option determination unit 18 determines whether to compile a sequence program using a method designated by the first option or using a method designated by the second option. The compilation-option determination unit 18 transmits first designation information designating the first option or second designation information designating the second option as a determination result to the memory allocation unit 14, the program selection unit 17, and the execution-program generation unit 16.

The memory allocation unit 14, the program selection unit 17, and the execution-program generation unit 16 perform the processing in accordance with the first designation information or the second designation information transmitted from the compilation-option determination unit 18. Specifically, when the memory allocation unit 14 receives the first designation information from the compilation-option determination unit 18, the memory allocation unit 14 assigns only a single memory address for each global variable. When the memory allocation unit 14 receives the second designation information from the compilation-option determination unit 18, the memory allocation unit 14 assigns memory addresses for a global variable using the same method as in the first embodiment.

When the program selection unit 17 receives the first designation information from the compilation-option determination unit 18, the program selection unit 17 selects all the sequence programs referencing the global variable whose assigned memory address has been changed. When the program selection unit 17 receives the second designation information from the compilation-option determination unit 18, the program selection unit 17 selects a sequence program using the same method as in the first embodiment.

When the execution-program generation unit 16 receives the first designation information from the compilation-option determination unit 18, the execution-program generation unit 16 compiles all the sequence programs referencing the global variable whose assigned memory address has been changed.

When the execution-program generation unit 16 receives the second designation information from the compilation-option determination unit 18, the execution-program generation unit 16 compiles a sequence program using the same method as in the first embodiment.

In a case with the first option, the execution-program generation unit 16 generates an execution program without inserting "copy" generated in the first embodiment. In a case with the second option, the execution-program generation unit 16 generates an instruction to perform data type conversion instead of a "copy" instruction generated in the first embodiment.

Figures 14, 15:
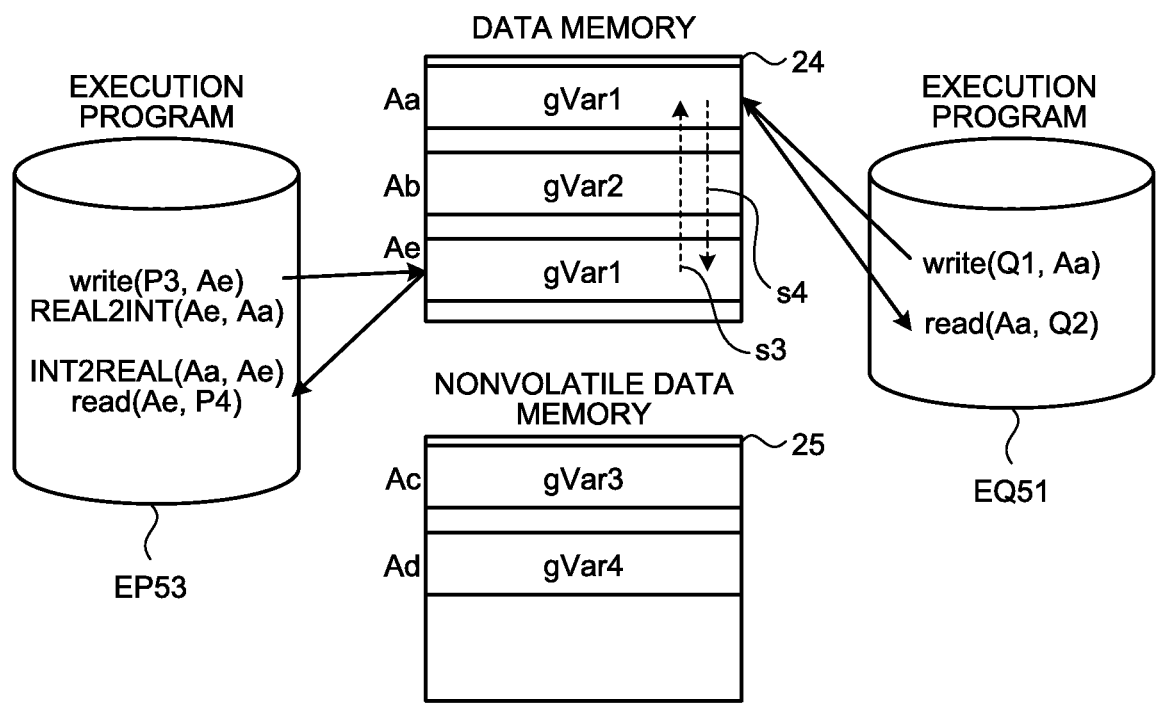
FIG. 14 is an explanatory diagram of an example of a global variable declaration according to the second embodiment after the global variable illustrated in FIG. 3 has been edited.
FIG. 15 is a diagram illustrating a relation between an execution program and a memory address as a reference location according to the second embodiment after a global variable has been edited.

FIG. 14 is an explanatory diagram of an example of a global variable declaration according to the second embodiment after the global variable illustrated in FIG. 3 has been edited. FIG. 14 illustrates a global variable declaration 363 in a case where the data type of gVar1 is changed as compared to the global variable declaration 361 illustrated in FIG. 3. It is assumed in the global variable declaration 363 that gVar1 having been declared as an instruction in FIG. 3 is deleted and instead treated as a comment, while gVar1 is declared as a global variable whose data type is the REAL type. In the IEC 61131-3 standards, the INT type is a 16-bit signed integral, while the REAL type is a 32-bit single precision floating point number. The data type illustrated in FIG. 14 is only an example, and other data types may also be applicable.

Different data sizes are required for respective data types such as the INT type and the REAL type defined in the IEC 61131-3 standards. Accordingly, the amount of memory allocated to a global variable differs between the data types. Therefore, in the present embodiment, in a case where a global variable has a plurality of assigned addresses due to editing the data type, the data sizes at the respective assigned addresses may differ.

In this case, the processing equivalent to copy described in the first embodiment needs to be able to synchronize the values of applicable data types with each other. However, in a case of copying a value of one data type to another with a different data size, the value of the copy source may not always match the value at the copy location. For example, when a value of the data type with a larger data size is copied to the data type with a smaller data size, the value, which falls out of the available range for the data type with a smaller data size, cannot be properly copied to the data type with a smaller data size. Therefore, in the present embodiment, one of the value indicating the first option and the value indicating the second option is stored in the compilation option 41 so as to compile a sequence program using a user-desired compilation method.

The second option will be described here in detail. As described above, the values of the data types with different data sizes may not always match each other although the value of one data type is copied to another. However, a specific category of data types, for example, data types indicating a numerical value, can represent an equal value in a given range although the data types are different from each other. Focusing attention on this point, the present embodiment does not ensure that the value of a global variable becomes equal between sequence programs, thereby excluding an unedited sequence program from the target to be compiled in the same manner as in the first embodiment.

In a case where the data type of gVar1 is edited from the INT type to the REAL type as illustrated in FIG. 14, the execution-program generation unit 16 inserts the following "REAL2INT (Cc, Cd)" instruction to convert the data type from the REAL type to the INT type in place of inserting "copy" immediately after "write" in the execution program EP52 illustrated in FIG. 11.

REAL2INT (Cc, Cd): Write the REAL-type value at a memory address Cc to the area of a memory address Cd as an INT-type value.

Similarly, the execution-program generation unit 16 inserts the following "INT2REAL (Cc, Cd)" instruction to convert the data type from the INT type to the REAL type in place of inserting "copy" immediately before "read" in the execution program EP52 illustrated in FIG. 11.

INT2REAL (Cc, Cd): Write the INT-type value at the memory address Cc to the area of the memory address Cd as a REAL-type value.

In this manner, the execution-program generation unit 16 uses an instruction to convert a data type and then write a converted data-type value to synchronize the value held at a memory address assigned to an unedited global variable with the value held at a memory address assigned to an edited global variable.

The above instructions "REAL2INT" and "INT2REAL" are implemented by a single instruction or an instruction group formed from a plurality of instructions in accordance with the architecture of the PLC 20. However, these instructions are assumed to be executed in an inseparable manner with "write" inserted immediately before "REAL2INT" or with "read" inserted immediately after "INT2REAL".

FIG. 15 is a diagram illustrating a relation between an execution program and a memory address as a reference location according to the second embodiment after a global variable has been edited. FIG. 15 illustrates a concept of allocation of global variables to the data memory 24 or the nonvolatile data memory 25 in accordance with the second option.

In the present embodiment, in the same manner as in the first embodiment, the sequence program 112P is created by editing the sequence program 111P, while the sequence program 111Q is not edited. When the second option is used, it is the sequence program 112P that is compiled, while the sequence program 111Q does not need to be compiled.

As illustrated in FIG. 15, gVar1 for an execution program EP53 having been edited and thus updated is allocated to the memory address Ae in the data memory 24. gVar1 for the unedited execution program EQ51 remains to be allocated to the memory address Aa in the data memory 24. As described above, in the present embodiment, in the same manner as in the first embodiment, while an address assigned to an unedited global variable is maintained, allocation of an edited global variable is performed.

"REAL2INT" is inserted immediately after "write" in the present embodiment instead of inserting "copy" in FIG. 11 in the first embodiment, while "INT2REAL" is inserted immediately before "read" in the present embodiment instead of inserting "copy" in FIG. 11 in the first embodiment.

Due to "REAL2INT", the value to be written as the REAL type by "write" to the memory address Ae referenced by the execution program EP53 is synchronized with the INT-type value at the memory address Aa referenced by the execution program EQ51 (s3). That is, due to "REAL2INT", the value at the memory address Ae is copied and the data type is converted, and then the converted data-type value is written to the memory address Aa.

Due to "INT2REAL", the value to be read as the INT type by "read" at the memory address Aa referenced by the execution program EQ51 is synchronized with the REAL-type value at the memory address Ae referenced by the execution program EP53 (s4). That is, due to "INT2REAL", the value at the memory address Aa is copied and the data type is converted, and then the converted data-type value is written to the memory address Ae.

Instructions to perform data type conversion "REAL2INT" and "INT2REAL" illustrated as an example in the present embodiment may be any instruction as long as the instruction is compatible with the data type available for a sequence program and with the architecture of the PLC 20.

As described above, in the second embodiment, a user can select between the first option and the second option using the compilation option 41. In a case where compilation is performed with the second option, the value held at the memory address Aa assigned to an unedited global variable is synchronized with the value held at the memory address Ae assigned to an edited global variable by an instruction to perform data type conversion. Due to this operation, even when there is a difference in data size between data types of an unedited global variable and an edited global variable, the unedited sequence program 111Q can still be excluded from the target to be compiled. Accordingly, the processing time required to compile sequence programs can be reduced.

Third Embodiment

Next, a third embodiment of the present invention will be described with reference to FIG. 16. In the third embodiment, in a case where a plurality of programming devices are connected to the PLC 20, a specific programming device compiles a specific sequence program.

Figure 16:
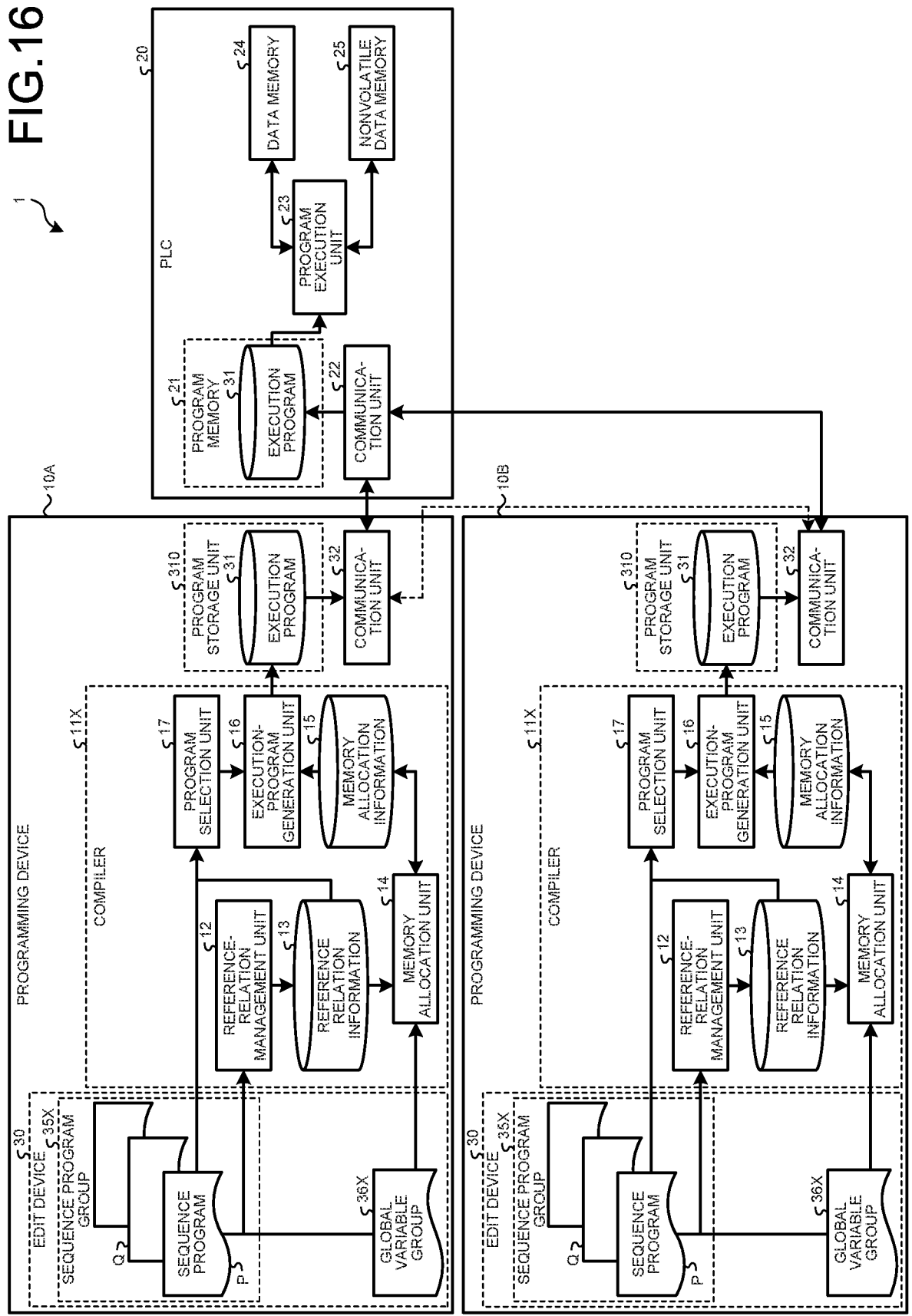
FIG. 16 is a block diagram illustrating a configuration of a programming system according to a third embodiment.

FIG. 16 is a block diagram illustrating a configuration of a programming system according to the third embodiment. Among the respective constituent elements in FIG. 16, constituent elements realizing the same functions as those of the programming device 10X according to the first embodiment illustrated in FIG. 1 are denoted by like reference signs and redundant descriptions thereof are omitted.

A programming system 1 that is a programming support system includes programming devices 10A and 10B, and the PLC 20. The programming devices 10A and 10B have the same functions as those of the programming device 10X. At least one of the programming devices 10A and 10B may have the same functions as those of the programming device 10Y. The programming devices 10A and 10B are connected to the PLC 20, and can thus transmit and receive information to and from each other through the PLC 20. It is also allowable that the programming devices 10A and 10B are connected directly to each other, or are connected through a device other than the PLC 20.

The programming system 1 copies the global variable group 36X and the memory allocation information 15 which have been created by the programming device 10A to the programming device 10B using a method (1-a) or (1-b) described below. The global variable group 36X copied from the programming device 10A to the programming device 10B is, for example, the global variable declaration 361. The memory allocation information 15 copied from the programming device 10A to the programming device 10B includes an assigned memory address and information indicating a reference program. In addition to the items described in FIG. 5, the programming device 10A has information, indicating that the memory allocation information 15 has been created by the programming device 10A, stored in the memory allocation information 15 in association with a global variable.

(1-a)

The programming device 10A transmits to the programming device 10B a file having stored therein the global variable group 36X and the memory allocation information 15. In the programming device 10B, the communication unit 32 that serves as a data obtaining unit receives the file from the programming device 10A. At this time, it is allowable that the programming devices 10A and 10B transmit and receive the global variable group 36X and the memory allocation information 15 by using any method such as copying the information on a network or sending an e-mail.

(1-b)

The programming device 10A writes the global variable group 36X and the memory allocation information 15 to the PLC 20. In the programming device 10B, the communication device 32 that serves as the data obtaining unit reads from the PLC 20 the global variable group 36X and the memory allocation information 15 which have been written to the PLC 20 by the programming device 10A. In this case, the PLC 20 has still stored therein the global variable group 36X and the memory allocation information 15 even after the programming device 10B has already read the written global variable group 36X and the memory allocation information 15.

The programming device 10B uses the global variable group 36X copied using the above method (1-a) or (1-b) to create a sequence program using a method (2-a) or (2-b) described below, and simultaneously changes the global variable declaration 361.

(2-a)

The programming device 10B creates a sequence program by the edit device 30 updating at least a part of the sequence program group 35X having been created by the programming device 10A. In this case, the programming devices 10A and 10B use the same method as described above as (1-a) or (1-b) to copy the sequence program group 35X having been created by the programming device 10A to the programming device 10B.

(2-b)

In the programming device 10B, the edit device 30 creates anew a sequence program.

The edit device 30 in the programming device 10B changes the global variable declaration 361 on the basis of the sequence program created using the method (2-a) or (2-b). The execution-program generation unit 16 in the programming device 10B compiles the sequence program created using the method (2-a) or (2-b) and the changed global variable. At this time, provided that there is a change in a memory address assigned to the existing global variable, the execution-program generation unit 16 in the programming device 10B performs compilation using the same method as in the first embodiment or the second embodiment. That is, while holding the original memory address, the execution-program generation unit 16 in the programming device 10B inserts an instruction to synchronize the values of the global variable between the original and additional memory addresses, and generates the execution program EP. At this time, the memory allocation unit 14 in the programming device 10B updates the memory allocation information 15.

In the programming system 1, the processing is performed as described above so that the programming device 10B can perform the processing without affecting the programming device 10A. Specifically, the programming device 10B can perform the processing such as changing or creating sequence programs without affecting the programming device 10A. This eliminates the need for compilation in the programming device 10A. The programming system 1 can thus reduce the compilation processing time. For example, when compilation is performed only by the programming device 10B, the total compilation time required is reduced as compared to the case where compilation is performed by both the programming device 10A and the programming device 10B.

An operation example of the programming system 1 will be described. It is assumed that the global variable declaration 361 illustrated in FIG. 3 is present in both the programming devices 10A and 10B, and the sequence program 111P illustrated in FIG. 4 is present only in the programming device 10B, while the sequence program 111Q illustrated in FIG. 4 is present only in the programming device 10A. Under this assumption, there are cases where only the programming device 10B may change the global variable declaration 361 to the global variable declaration 362 illustrated in FIG. 7, and simultaneously change the sequence program 111P to the sequence program 112P illustrated in FIG. 8. In such cases, only the programming device 10B performs compilation and writing to the PLC 20, while the programming device 10A does not perform compilation or writing to the PLC 20. This brings the PLC 20 into the state as illustrated in FIG. 11.

As described above, in the third embodiment, the programming device 10B performs the processing such as changing or creating sequence programs without affecting the programming device 10A. This eliminates the need for compilation in the programming device 10A. As a result, the programming system 1 can reduce the compilation processing time.

A hardware configuration of the programming devices 10X and 10Y will be described below. Since the programming devices 10X and 10Y have an identical hardware configuration, only the hardware configuration of the programming device 10X is described below.

Figure 17:
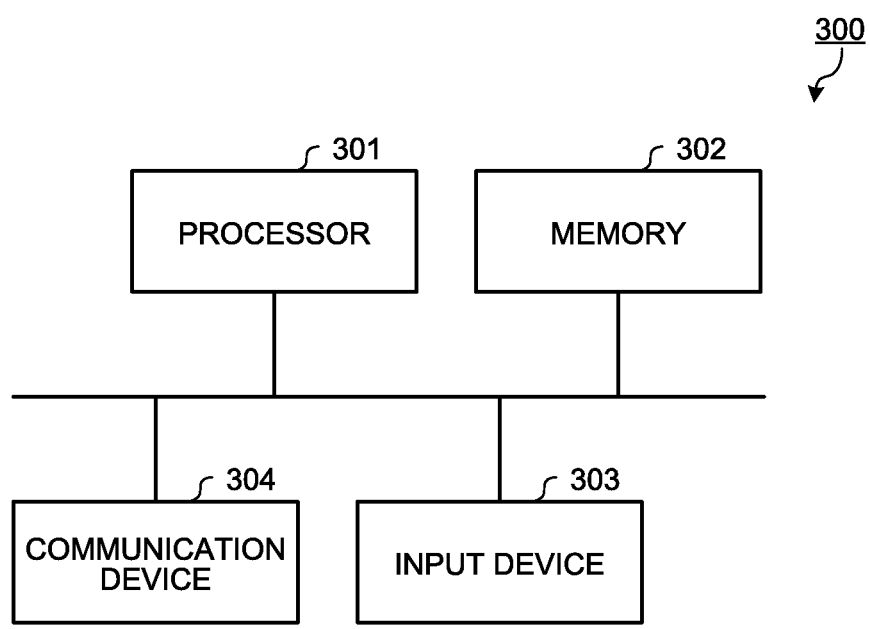
FIG. 17 is a diagram illustrating a hardware configuration example of the programing device according to the first to third embodiments.

FIG. 17 is a diagram illustrating an example of the hardware configuration of the programming device according to the first to third embodiments. The programming device 10X can be implemented by a control circuit 300 illustrated in FIG. 17, that is, a processor 301, a memory 302, a communication device 304, and an input device 303.

The processor 301 is, for example, a CPU (Central Processing Unit, which is also referred to as "processing device", "computing device", "microprocessor", "microcomputer", "processor", or "DSP") or a system LSI (Large Scale Integration). The memory 302 is, for example, a RAM (Random Access Memory) or a ROM (Read Only Memory). The input device 303 is, for example, a keyboard, a mouse, or a touch panel. The communication device 304 implements the function of the communication unit 32.

The programming device 10X is implemented by the processor 301 reading the compiler 11X and an edit program for causing the edit device 30 to operate from the memory 302, and executing the compiler 11X and the edit program. The compiler 11X that is a compilation program is also regarded as causing a computer to execute the procedures or methods of the reference-relation management unit 12, the memory allocation unit 14, the program selection unit 17, and the execution-program generation unit 16. The edit program is also regarded as causing a computer to execute the procedure or method of the edit device 30. The memory 302 also serves as a transitory memory used by the processor 301 to perform various types of processing.

While the compiler 11X is executed by the processor 301, it is also allowable that the compiler 11X is implemented by a computer program product that is a storage medium having the compiler 11X stored therein. In this case, the storage medium is, for example, a non-transitory computer-readable medium having the compiler 11X stored therein. The edit program executed by the processor 301 can be implemented by a computer program product that is a storage medium having the edit program stored therein. In this case, the storage medium is, for example, a non-transitory computer-readable medium having the edit program stored therein.

As for the functions of the programming device 10X, it is also possible that a part of the functions is realized by dedicated hardware and a part thereof is realized by software or firmware.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1 programming system, 10A, 10B, 10X, 10Y programming device, 11X, 11Y compiler, 12 reference-relation management unit, 13 reference relation information, 14 memory allocation unit, 15 memory allocation information, 16 execution-program generation unit, 17 program selection unit, 18 compilation-option determination unit, 20 PLC, 21 program memory, 22 communication unit, 23 program execution unit, 24 data memory, 25 nonvolatile data memory, 30 edit device, 31 execution program, 32 communication unit, 35X sequence program group, 36X global variable group, 41 compilation option, 111P, 111Q, 112P, P, Q sequence program, 151, 152 memory allocation information, 310 program storage unit, 361 to 363 global variable declaration, Aa, Ab, Ac, Ad, Ae memory address, EP51 to EP53, EQ51 execution program.

The invention claimed is:

1. A non-transitory computer-readable medium storing a compiler to cause a computer to perform processing for compiling a sequence program including a declaration of a global variable and generating an execution program to be executed by a control device, wherein
when there is a change in a memory address in the control device assigned to the global variable between before and after edit of a declaration of the global variable, the compiler causes the computer to perform processing for giving an execution code to synchronize a first value stored at a memory address assigned to an unedited global variable with a second value stored at a memory address assigned to an edited global variable to an execution program corresponding to a sequence program that references the edited global variable.

2. The non-transitory computer-readable medium according to claim 1, wherein on a basis of change or no-change information indicating that the global variable and a sequence program including a declaration of the global variable have been changed or added, the compiler is capable of selecting a sequence program that references the edited global variable and that is a target to be given the execution code from among a sequence program group including a plurality of sequence programs.

3. The non-transitory computer-readable medium according to claim 1, wherein the execution code is formed from a single instruction.

4. The non-transitory computer-readable medium according to claim 1, wherein the execution code is formed from a plurality of instructions.

5. The non-transitory computer-readable medium according to claim 1, wherein when the unedited global variable and the edited global variable are of a same data type, the compiler uses a copy instruction for the execution code so as to copy and write the second value to a memory address assigned to the unedited global variable, or so as to copy and write the first value to a memory address assigned to the edited global variable, thereby synchronizing the second value with the first value.

6. The non-transitory computer-readable medium according to claim 1, wherein when the unedited global variable and the edited global variable are of different data types, the compiler uses an instruction to convert a data type and write a converted data-type value for the execution code so as to copy the second value and then convert a data type of the second value to be written to a memory address assigned to the unedited global variable, or so as to copy the first value and then convert a data type of the first value to be written to a memory address assigned to the edited global variable, thereby synchronizing the second value with the first value.

7. A programming support device comprising:
the non-transitory computer-readable medium according to claim 1; and
edit circuitry configured to edit the global variable and a sequence program including a declaration of the global variable in accordance with instructions from a user, and to be capable of selecting a sequence program that references the edited global variable and that is a target to be given the execution code from among a sequence program group including a plurality of sequence programs in accordance with instructions from a user.

8. A programming support device including a compiler to compile a sequence program including a declaration of a global variable and to generate an execution program to be executed by a control device, the programming support device comprising:
data obtaining circuitry configured to obtain the global variable declared by a separate programming support device from the programming support device, and a memory address in the control device assigned to the global variable,
wherein when there is a change in a memory address in the control device assigned to the global variable between before and after edit of a declaration of the global variable, the compiler gives an execution code to synchronize a first value stored at a memory address assigned to an unedited global variable with a second value stored at a memory address assigned to an edited global variable to an execution program corresponding to a sequence program that references the edited global variable.

9. The programming support device according to claim 8, wherein the data obtaining circuitry receives the global variable and a memory address assigned to the global variable allocated to a memory in the control device from the separate programming support device.

10. The programming support device according to claim 8, wherein:
the data obtaining circuitry reads the global variable and a memory address assigned to the global variable allocated to a memory in the control device from the control device to which an execution program has been written, the execution program being generated by the separate programming support device.

* * * * *